United States Patent
Ogawa et al.

(10) Patent No.: US 8,411,409 B2
(45) Date of Patent: Apr. 2, 2013

(54) CERAMIC ELECTRONIC COMPONENT AND MANUFACTURING METHOD THEREFOR

(75) Inventors: Makoto Ogawa, Nagaokakyo (JP);
Akihiro Motoki, Nagaokakyo (JP);
Masahito Saruban, Nagaokakyo (JP);
Toshiyuki Iwanaga, Nagaokakyo (JP);
Syunsuke Takeuchi, Nagaokakyo (JP);
Kiyoyasu Sakurada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 134 days.

(21) Appl. No.: 13/161,535

(22) Filed: Jun. 16, 2011

(65) Prior Publication Data

US 2011/0309718 A1    Dec. 22, 2011

(30) Foreign Application Priority Data

Jun. 17, 2010 (JP) ................. 2010-137881

(51) Int. Cl.
*H01G 4/30* (2006.01)
(52) U.S. Cl. .............. 361/301.4; 361/311; 361/313; 361/321.1; 361/321.2; 361/306.3
(58) Field of Classification Search ............... 361/301.4, 361/301.2, 308.1, 309, 311–313, 321.1, 321.2, 361/306.1, 306.3
See application file for complete search history.

(56) References Cited

U.S. PATENT DOCUMENTS

| | | | |
|---|---|---|---|
| 6,295,196 B1 * | 9/2001 | Hamaji et al. ............. | 361/321.2 |
| 6,373,368 B1 | 4/2002 | Shikama et al. | |
| 6,663,798 B2 * | 12/2003 | Sato et al. ...................... | 252/512 |
| 6,729,003 B2 * | 5/2004 | Yokoyama et al. .......... | 29/25.41 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 * | 3/2008 | Trinh ......................... | 361/306.3 |
| 7,463,474 B2 * | 12/2008 | Ritter et al. ................ | 361/306.1 |
| 8,130,485 B2 * | 3/2012 | Ogawa et al. ................ | 361/309 |

(Continued)

FOREIGN PATENT DOCUMENTS

| JP | 63-169014 A | 7/1988 |
|---|---|---|
| JP | 2000-082604 A | 3/2000 |

(Continued)

*Primary Examiner* — Nguyen T Ha
(74) *Attorney, Agent, or Firm* — Keating & Bennett, LLP

(57) ABSTRACT

When an external terminal electrode of a ceramic electronic component such as a laminated ceramic capacitor is formed by plating, plating growth may be also caused even in an undesired location. The ceramic surface provided by a component main body is configured to include a high plating growth region of, for example, a barium titanate based ceramic, which exhibits relatively high plating growth, and a low plating growth region of, for example, a calcium zirconate based ceramic, which exhibits relatively low plating growth. The plating film constituting a first layer to define a base for an external terminal electrode is formed in such a way that the growth of a plated deposit deposited with conductive surfaces provided by exposed ends of internal electrodes as starting points is limited so as not to cross over a boundary between the high plating growth region and the low plating growth region toward the low plating growth region.

10 Claims, 7 Drawing Sheets

U.S. PATENT DOCUMENTS

| | | | |
|---|---|---|---|
| 8,149,566 B2 * | 4/2012 | Motoki et al. | 361/305 |
| 8,254,081 B2 * | 8/2012 | Nishihara et al. | 361/300 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

| | | |
|---|---|---|
| JP | 2001-155950 A | 6/2001 |
| JP | 2004-015016 A | 1/2004 |
| JP | 2004-146401 A | 5/2004 |

* cited by examiner

CERAMIC ELECTRONIC COMPONENT AND MANUFACTURING METHOD THEREFOR

BACKGROUND OF THE INVENTION

1. Field of the Invention

The present invention relates to a ceramic electronic component and a method for manufacturing the ceramic electronic component, and more particularly, the present invention relates to a ceramic electronic component in which an electrode such as an external terminal electrode on a component main body includes a plating film formed by plating, and a method for manufacturing the ceramic electronic component.

2. Description of the Related Art

As shown in FIG. 7, a laminate-type ceramic electronic component 101 typified by a laminated ceramic capacitor typically includes a component main body 105 which has a stack structure including a plurality of stacked ceramic layers 102 of, for example, a dielectric ceramic, and a plurality of layered internal electrodes 103 and 104 formed along the interfaces between the ceramic layers 102. The plurality of internal electrodes 103 and the plurality of internal electrodes 104 each have ends respectively exposed at one and the other end surfaces 106 and 107 of the component main body 105, and external terminal electrodes 108 and 109 are formed respectively so as to electrically connect the respective ends of the internal electrodes 103 to each other and the respective ends of the internal electrodes 104 to each other.

For the formation of the external terminal electrodes 108 and 109, typically, a metal paste containing a metal constituent and a glass constituent is applied onto the end surfaces 106 and 107 of the component main body 105, and then subjected to firing, thereby first forming paste electrode films 110. Next, a first plating film 111 containing, for example, nickel as its main constituent is formed on the paste electrode films 110, and a second plating film 112 containing, for example, tin or gold as its main constituent is further formed thereon. More specifically, the external terminal electrodes 108 and 109 are each constituted of a three-layer structure of the paste electrode film 110, the first plating film 111, and the second plating film 112.

The external terminal electrodes 108 and 109 are required to provide favorable solderability when the laminate-type ceramic electronic component 101 is mounted onto a substrate with the use of solder. At the same time, the external terminal electrode 108 is required to serve to electrically connect the plurality of internal electrodes 103 to each other, which are electrically insulated from each other, and the external terminal electrode 109 is required to serve to electrically connect the plurality of internal electrodes 104 to each other, which are electrically insulated from each other. The second plating film 112 described above serves to ensure solderability, whereas the paste electrode film 110 serves to electrically connect the internal electrodes 103 to each other and the internal electrodes 104 to each other. The first plating film 111 serves to prevent solder erosion in the solder joint.

However, the paste electrode film 110 has a large thickness of several tens of μm to several hundreds of μm. Therefore, in order to limit the dimensions of the laminate-type electronic component 101 up to certain specifications, there is undesirably a need to reduce the effective volume for ensuring a capacitance because there is a need to ensure the paste electrode layers 110 in terms of volume. On the other hand, the plating films 111 and 112 each have a thickness on the order of several μm. Thus, if the external terminal electrodes 108 and 109 can be constituted only of the first plating film 111 and the second plating film 112, the effective volume can be ensured more for ensuring the capacitance.

For example, Japanese Patent Application Laid-Open No. 2004-146401 discloses a method in which a conductive paste is applied to at least ridge sections of edge surfaces of a laminate (component main body) along the stacking direction of internal electrodes so as to come into contact with leading sections of the internal electrodes, and the conductive paste is subjected to firing or thermal curing to form a conductive film, and further, the edge surfaces of the laminate are subjected to electroplating, thereby forming an electroplating film so as to be connected to the conductive film on the ridge sections described above. According to this method, the external terminal electrodes on the edge surfaces can be reduced in thickness.

In addition, Japanese Patent Application Laid-Open No. 63-169014 discloses a method in which an electroless plating film is formed on the entire sidewall surface of a component main body, at which internal electrodes are exposed, so as to short circuit the internal electrodes exposed at the sidewall surface. According to this method, the external terminal electrodes can also be reduced in thickness.

The plating film described above is basically formed by growing a plated deposit that is deposited while using, as starting points, exposed sections of the internal electrodes as conductors, so as to provide a substantially uniform thickness on the ceramic section. More specifically, plating growth in a direction parallel to a surface to be plated is used for the formation of the plating film.

Therefore, when a plating film is also desired to grow efficiently in a location with no exposed sections of internal electrodes, such as a ridge-line section of a component main body, there is typically a need to form in advance a conductive film to serve as a base for the plating film, as described also in Japanese Patent Application Laid-Open No. 2004-146401 mentioned above. However, the formation of the conductive film to serve as a base leads to an increase in cost or an increase in the number of steps.

In order to solve this problem, a method has been also considered in which, in the formation of a plating film, the plating condition is set so as to provide considerably high plating growth to allow for plating growth directly onto the surface of the ceramic section. However, the condition for higher plating growth rather has difficulty with controlling plating growth, and has difficulty with placing an end edge of the plating film in a predetermined position.

On the other hand, the disclosure of, for example, Japanese Patent Application Laid-Open No. 2004-15016, has been attracting attention as a method which allows the control of plating growth described above. Japanese Patent Application Laid-Open No. 2004-15016 discloses a technique for plating onto a surface of an external terminal electrode after the formation of the external terminal electrode by firing onto a component main body in a method for producing a chip-type electronic component such as a laminated chip thermistor, rather than a technique for forming a plating film directly onto a surface of a component main body.

In the case of the thermistor as described in Japanese Patent Application Laid-Open No. 2004-15016, the component main body is configured with the use of a semiconductor ceramic, and thus has a relatively low surface resistance. Therefore, the thermistor has a problem that plating growth is likely to be caused on an undesired location of the component main body.

In order to solve this problem, Japanese Patent Application Laid-Open No. 2004-15016 discloses several techniques, and to make an explanation, for example, with reference to FIG. 7, discloses the formation of a glass layer 113 on a section of the surface of the component main body 105 without the external terminal electrodes 108 and 109 being formed, and the formation of a water repellent layer 114 thereon which is of a titanate coupling agent, as indicated by a dashed line. Japanese Patent Application Laid-Open No. 2004-15016 also discloses an example of forming only the water repellent layer 114 without the formation of the glass layer 113.

The glass layer and the water repellent layer described above are effective for preventing undesired plating growth. However, the techniques disclosed in Japanese Patent Application Laid-Open No. 2004-15016 have the following problems.

First, in each case of the glass layer and the water repellent layer, it is difficult to form these layers without variation in a desired location such as a location with no external terminal electrode formed, when a coating step or an immersion step is required for the formation of these layers. This difficulty makes the control of plating growth difficult.

In addition, in the case of the glass layer, the layer may have the property of being easily dissolved in a plating solution. Therefore, when the technique disclosed in Japanese Patent Application Laid-Open No. 2004-15016 is diverted to a technique for forming a plating film directly onto a surface of a component main body, the glass layer may be partially dissolved in a plating solution to cause undesired plating growth. While it may be possible to use a plating solution which never causes this problem, the degree of freedom for the design of the plating bath will be decreased in this case.

In addition, when a water repellent agent is used in the technique for forming a plating film directly onto a surface of a component main body, there is an increased concern that plating growth may also be inhibited in a location requiring plating growth. Therefore, this case also makes the control of plating growth difficult.

SUMMARY OF THE INVENTION

Preferred embodiments of the present invention provide a ceramic electronic component and a method for manufacturing the ceramic electronic component, which solve the problems described above.

According to a preferred embodiment of the present invention, a ceramic electronic component includes a component main body with a surface including a ceramic surface of a ceramic and a conductive surface of a conductor, and a plating film including a plated deposit that is deposited with the conductive surface as a starting point and grown on the ceramic surface, and includes the following features in order to solve the technical problems described above.

More specifically, a preferred embodiment of the present invention includes a feature that the ceramic surface includes a high plating growth region of a first ceramic, the high plating growth region exhibiting relatively high plating growth, and a low plating growth region of a second ceramic different from the first ceramic, the low plating growth region exhibiting relatively low plating growth, and the plating film is formed from the conductive surface in such a way that growth is limited so as not to cross over a boundary between the high plating growth region and the low plating growth region toward the low plating growth region.

In the ceramic electronic component according to a preferred embodiment of the present invention, when the component main body includes a ceramic section defining the ceramic surface, and an internal electrode arranged in the ceramic section so as to be partially exposed at a surface of the ceramic section, at least a portion of the conductive surface may be provided by the internal electrode. Alternatively, when the component main body further includes a conductor film provided on the exposed surface of the internal electrode in the ceramic section, at least a portion of the conductive surface may be provided by the conductor film.

In a preferred embodiment of the ceramic electronic component according to the present invention, the component main body has a stack structure including a plurality of stacked ceramic layers and a plurality of internal electrodes arranged along specific interfaces between the ceramic layers and partially exposed. In addition, the component main body preferably has a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T. In this case, the internal electrodes extend parallel or substantially parallel to the LW surface, the WT surface corresponds to exposed surfaces of the internal electrodes, and the plating film is intended to serve as at least a portion of an external terminal electrode electrically connected to the internal electrodes, and arranged so as to cover the WT surface and extend from the WT surface to at least a portion of the LW surface. Furthermore, the component main body has an outer surface including the second ceramic, except for a region of the outer surface with the plating film formed thereon.

In a preferred embodiment of the present invention, more preferably, among the ceramic layers included in the component main body, the ceramic layers constituting the outermost layers include the second ceramic, whereas the ceramic layers constituting intermediate layers include the first ceramic, the ceramic layers constituting the outermost layers have a shorter length dimension as compared with the ceramic layers constituting the intermediate layers, and are stacked so as to expose both ends in the length direction of the ceramic layers constituting the intermediate layers, the component main body further includes a ceramic layer of the second ceramic, the ceramic layer being arranged so as to follow the LT surface, and the plating film is arranged so as to extend from the WT surface to the exposed both ends in the length direction of the ceramic layers constituting the intermediate layers.

In the ceramic electronic component according to a preferred embodiment of the present invention, for example, the first ceramic has a composition containing barium titanate as its main constituent, whereas the second ceramic has a composition containing calcium zirconate as its main constituent.

According to another preferred embodiment of the present invention, a method for manufacturing a ceramic electronic component includes a step of preparing a component main body with a surface including a ceramic surface of a ceramic and a conductive surface of a conductor, the ceramic surface including a high plating growth region of a first ceramic, the high plating growth region exhibiting relatively high plating growth, and a low plating growth region of a second ceramic different from the first ceramic, the low plating growth region exhibiting relatively low plating growth; and a plating treatment step of forming a plating film by depositing a plated deposit with the conductive surface as a starting point and growing the plated deposit from the conductive surface in such a way that growth is limited so as not to cross over the boundary between the high plating growth region and the low plating growth region toward the low plating growth region.

In the step of preparing the component main body, the following steps are preferably carried out: a step of preparing first ceramic green sheets containing the first ceramic; a step of forming an internal electrode on specific ones of the first ceramic green sheets; a step of obtaining a laminate including the first ceramic green sheets by stacking the first ceramic green sheets; a step of obtaining a green sheet laminate corresponding to the component main body in the raw by forming a film containing the second ceramic in a location of the laminate including the first ceramic green sheets, the location requiring no formation of the plating film; and a step of firing the green sheet laminate.

More preferably, in the step of preparing the component main body, the following steps are preferably carried out: a step of preparing first ceramic green sheets containing the first ceramic; a step of forming an internal electrode on specific ones of the first ceramic green sheets; a step of producing an assembled green sheet laminate by stacking the first ceramic green sheets, the assembled green sheet laminate having a plurality of sections to serve as component main bodies distributed in rows and columns; a step of forming a film containing the second ceramic in a location of a principal surface of the assembled green sheet laminate, the location requiring no formation of the plating film; then, a step of extracting a plurality of strip-shaped green sheet laminates by cutting the assembled green sheet laminate into strip shapes; a step of forming a film containing the second ceramic on surfaces of the strip-shaped green sheet laminates, the surfaces developed by the cutting; a step of extracting a plurality of green sheet laminates for individual ceramic electronic components by cutting the strip-shaped green sheet laminates; and a step of firing the green sheet laminates.

The step of forming the film containing the second ceramic includes a step of preparing a second ceramic green sheet including the second ceramic, and a step of attaching the second ceramic green sheet.

According to various preferred embodiments of the present invention, in order to suppress plating growth in a location requiring no formation of a plating film, the low plating growth region of the second ceramic is formed which exhibits relatively low plating growth, and in order to form the low plating growth region, the firing step may be carried out with the film containing the second ceramic formed in a desired location. Therefore, there is no need to form any glass layer or water repellent layer as described in Japanese Patent Application Laid-Open No. 2004-15016. Thus, there is no need to carry out any coating step or immersion step for the formation of the glass layer or the water repellent layer. Accordingly, the low plating growth region can be formed without variation only in a location intended to suppress plating growth.

In addition, according to various preferred embodiments of the present invention, there is no need to use any water repellent agent, and the situation can be thus avoided in which the water repellent agent is applied to a location requiring plating growth.

Accordingly, preferred embodiments of the present invention allow plating growth to be easily controlled.

In addition, according to various preferred embodiments of the present invention, there is no need to form any glass layer, and preferred embodiments of the present invention thus never suffer from the glass property of being easily dissolved in a plating solution. Therefore, preferred embodiments of the present invention never encounter the problem of the glass layer partially dissolved in a plating solution to cause undesired plating growth, and increase the degree of freedom for the design of the plating bath.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2-1 and 2-2 are cross-sectional views illustrating states in the process of manufacturing the ceramic electronic component shown in FIG. 1, which respectively illustrates the state of a component main body before the formation of external terminal electrodes and the state of the component main body after the formation of first layers in the external terminal electrodes.

DETAILED DESCRIPTION OF THE PREFERRED EMBODIMENTS

Figure 1:
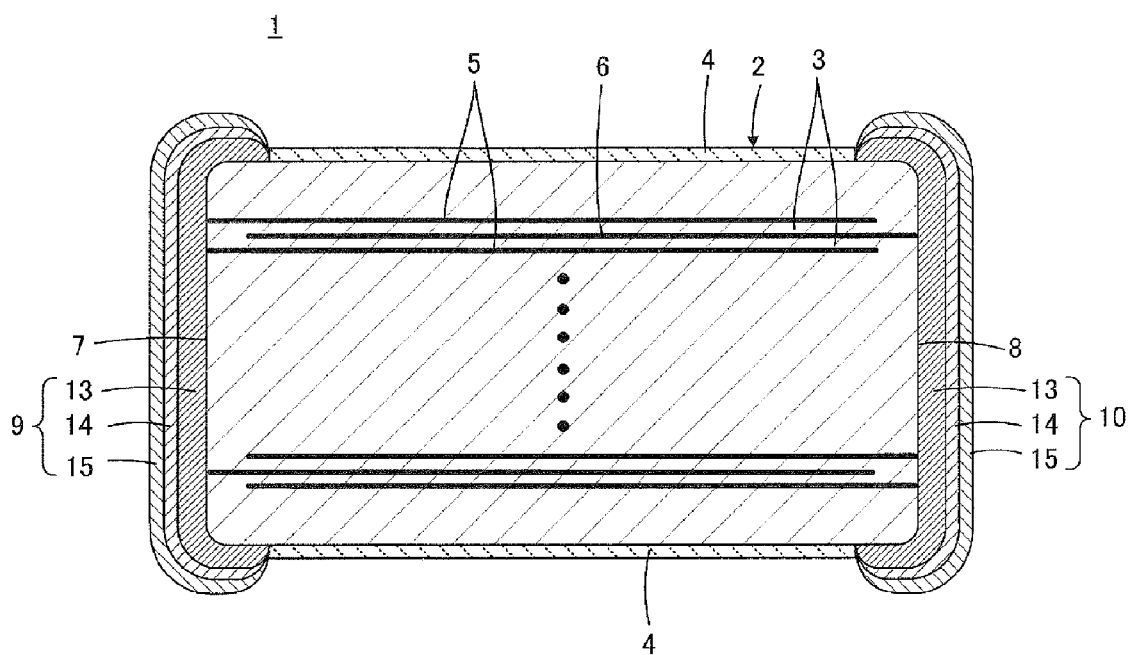
FIG. 1 is a cross-sectional view illustrating a ceramic electronic component according to a preferred embodiment of the present invention.

A ceramic electronic component 1 according to a preferred embodiment of the present invention will be described with reference to FIGS. 1, 2-1 and 2-2.

The ceramic electronic component 1 includes a component main body 2. The component main body 2 has a stack structure including a plurality of ceramic layers 3 and 4 stacked on each other. The ceramic layers 3 constitute intermediate layers, whereas the ceramic layers 4 constitute the outermost layers. A plurality of internal electrodes 5 and 6 are arranged along the specific interfaces between the ceramic layers 3 constituting the intermediate layers. The internal electrodes 5 and 6 preferably contain, for example, nickel as their main constituent.

Figure 6:
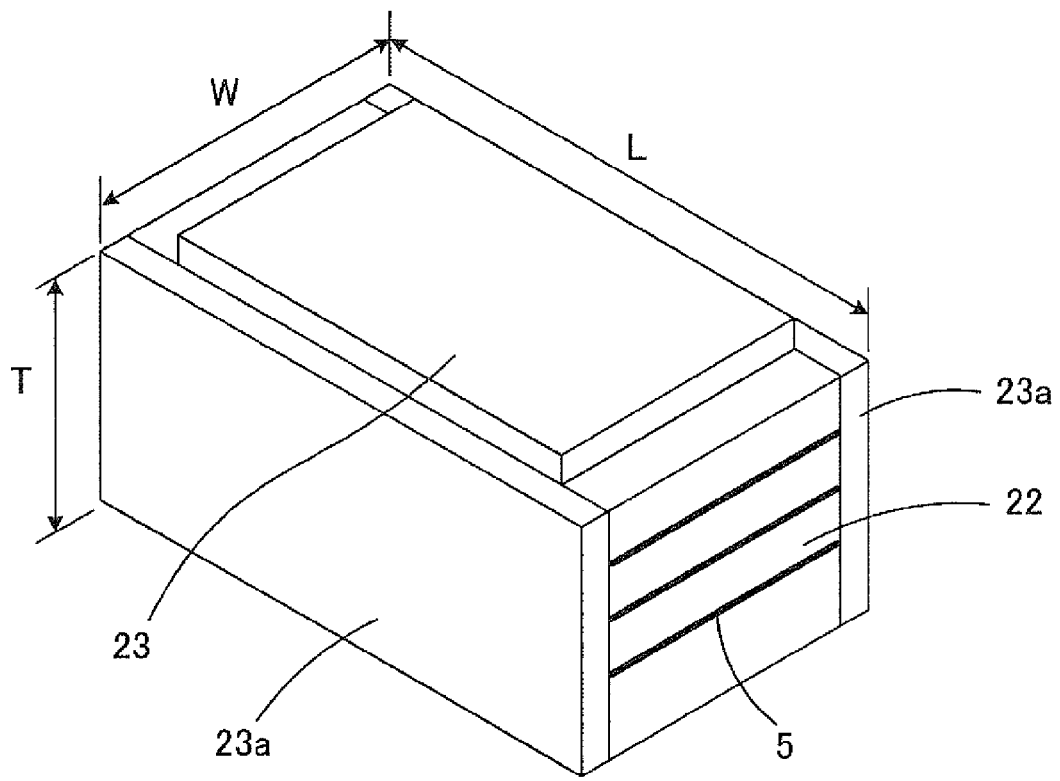
FIG. 6 is a perspective view illustrating a green sheet laminate for individual ceramic electronic components obtained by cutting the strip-shaped green sheet laminate shown in FIG. 5.
Figure 7:
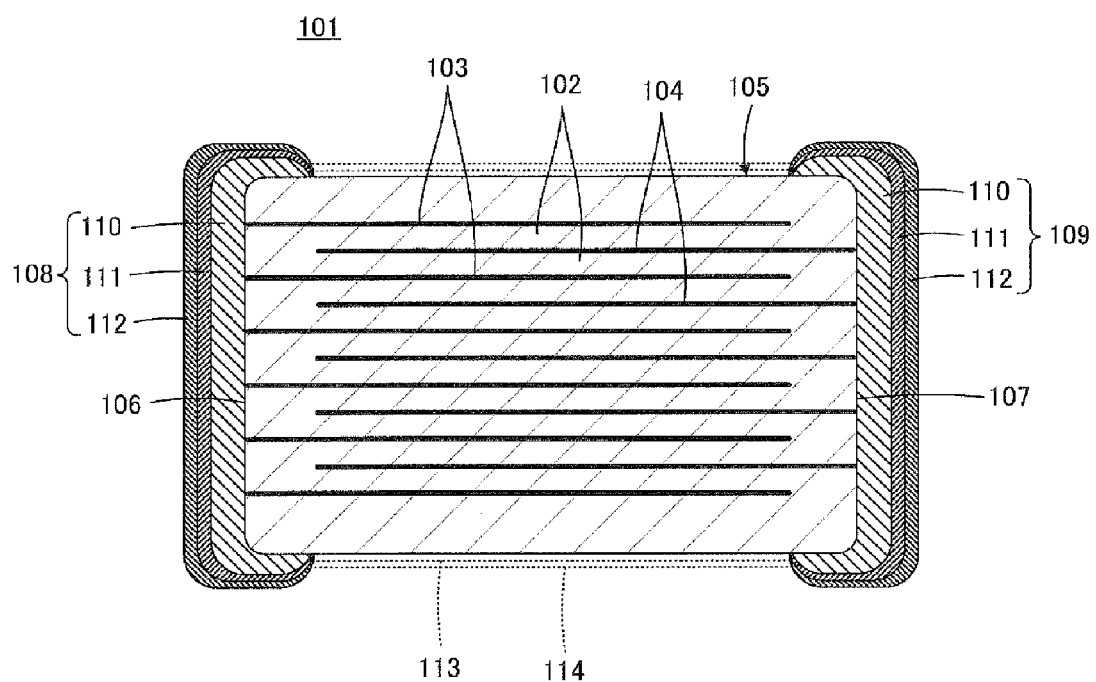
FIG. 7 is a cross-sectional view illustrating a conventional laminate-type ceramic electronic component.

The component main body 2 preferably has a rectangular parallelepiped shape or a substantially rectangular parallelepiped shape including an LW surface defined by the length dimension L and the width dimension W, an LT surface defined by the length dimension L and the thickness dimension T, and a WT surface defined by the width dimension W and the thickness dimension T. It is to be noted that the length dimension L, the width dimension W, and the thickness dimension T are shown in FIG. 6 which illustrates a green sheet laminate 30 corresponding to the component main body 2 before firing.

The internal electrodes 5 and 6 extend parallel or substantially parallel to the LW surface. In addition, the WT surface of the component main body 2, that is, the one and other end surfaces 7 and 8 respectively have each exposed end of the plurality of internal electrodes 5 and of the plurality of internal electrodes 6. Furthermore, external terminal electrodes 9 and 10 are arranged respectively in such a way that the thus exposed respective ends of the internal electrodes 3 are electrically connected to each other and the thus exposed respective ends of the internal electrodes 4 are electrically connected to each other.

It is to be noted that while the ceramic electronic component 1 shown is a two-terminal ceramic electronic component including the two external terminal electrodes 9 and 10, the present invention can also be applied to multi-terminal ceramic electronic components.

The ceramic layers 4 constituting the outermost layers described above have a smaller length dimension as compared with the ceramic layers 3 constituting the intermediate layers, which are stacked with both ends exposed in the length direction of the ceramic layers 3 constituting the intermediate layers. The external terminal electrodes 9 and 10 described above are preferably arranged so as to extend from the WT surface, that is, the end surfaces 7 and 8 onto the both ends exposed in the length direction of the ceramic layers 3 constituting the intermediate layers.

When the ceramic electronic component 1 constitutes a laminated ceramic capacitor, the ceramic layers 3 and 4, in particular, the ceramic layers 3 located between the internal electrodes 5 and 6 are constituted of a dielectric ceramic. It is to be noted that the ceramic electronic component 1 may constitute other inductor, thermistor, piezoelectric component, etc. Therefore, depending on the function of the ceramic electronic component 1, the ceramic layers 3 may be constituted of, in addition to a dielectric ceramic, a magnetic ceramic, a semiconductor ceramic, a piezoelectric ceramic, etc.

Various preferred embodiments of the present invention preferably use first and second ceramics which have different compositions from each other. The ceramic layers 3 constituting the intermediate layers are constituted of the first ceramic, whereas the ceramic layers 4 constituting the outermost layers are constituted of the second ceramic. A ceramic which exhibits relatively high plating growth at the surface thereof is preferably selected as the first ceramic, whereas a ceramic which exhibits relatively low plating growth at the surface thereof is preferably selected as the second ceramic.

When the ceramic electronic component 1 constitutes a laminated ceramic capacitor, more specifically, a ceramic which has a composition containing a barium titanate as its main constituent is preferably used as the first ceramic, whereas a ceramic which has a composition containing a calcium zirconate as its main constituent is preferably used as the second ceramic. In the case of the barium titanate type, Ba may be substituted with some Ca or Sr, and in addition, Ti may be substituted with some Zr. In the case of the calcium zirconate type, Ca may be substituted with some Sr or Ba, and in addition, Zr may be substituted with some Ti. The barium titanate type and the calcium zirconate type each may contain accessory constituents such as rare earth elements, Mg, Mn, and Si, for example.

It is important that preferred embodiments of the present invention that the first ceramic and the second ceramic respectively satisfy the condition that the former exhibits relatively high plating growth and the latter exhibits low plating growth, and the specific compositions for each of the first and second ceramics are not limited to those mentioned above.

Figures 1, 2:
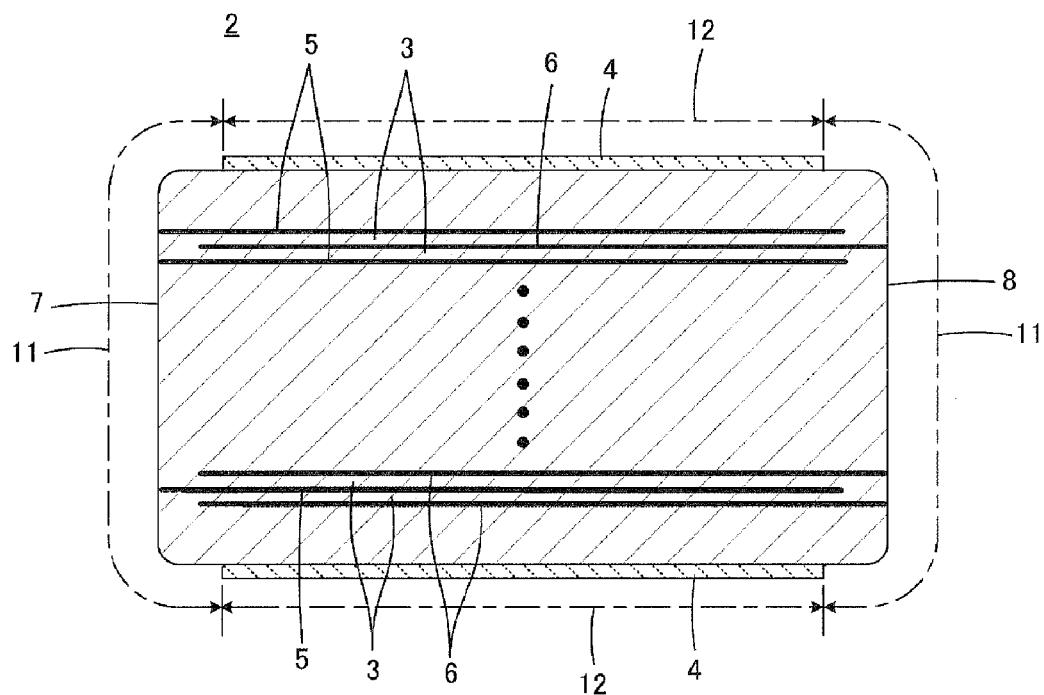
Figure 2:
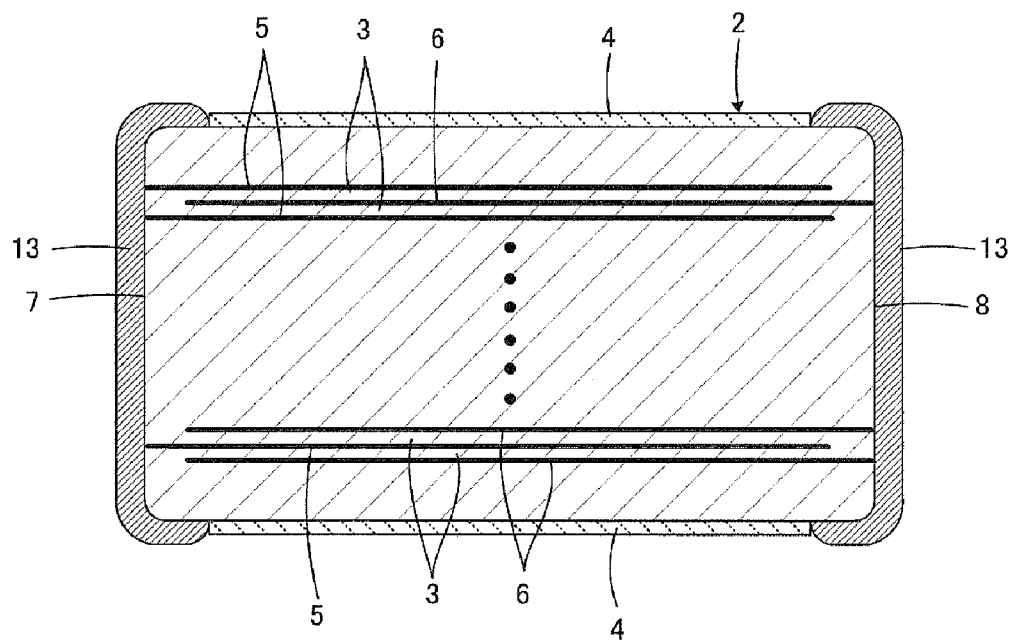

Further, although not shown in FIGS. 1, 2-1 and 2-2, as is expected from a second ceramic green sheet 23a for a side surface in FIG. 6 which illustrates the green sheet laminate 30 corresponding to the component main body 2 before firing, the component main body 2 preferably further includes a ceramic layer of the second ceramic which exhibits relatively low plating growth, which is arranged so as to follow the LT surface, that is, the side surface.

The component main body 2 configured as described above includes, at the surface thereof, a ceramic surface and a conductive surface arranged such that the ceramic surface is defined by a surface of the ceramic provided by the ceramic layers 3 and 4; and the conductive surface is defined by a surface of the conductor defined by the exposed ends of the internal electrodes 5 and 6, and the ceramic surface has a high plating growth region 11 and a low plating growth region 12 arranged as shown in FIGS. 2-1 and 2-2, such that the high plating growth region 11 is a region of the first ceramic and exhibits relatively high plating growth; and the low plating growth region 12 is a region of the second ceramic and exhibits relatively low plating growth.

The external terminal electrodes 9 and 10 each includes a first layer 13 of a plating film formed by plating directly on the exposed surfaces of the internal electrodes 5 and 6 in the component main body 2, that is, the end surface 7 and 8; a second layer 14 formed thereon of a plating film, and a third layer 15 formed thereon of a plating film. It is to be noted that for the formation of these plating films, electroplating through a current applying process may be applied, or electroless plating for depositing metal ions with the use of a reducing agent may be applied, for example.

The first layer 13 is intended to electrically connect the plurality of internal electrodes 5 to each other and the plurality of internal electrodes 6 to each other, and preferably contains copper as its main constituent. Copper has the advantages of favorable throwing power in a plating treatment, an ability to improve the efficiency of the plating treatment, and an ability to increase the fixing strength of the external terminal electrodes 9 and 10. However, if these advantages are not particularly desired, the first layer 13 may be constituted of other metal such as nickel.

The second layer 14 and the third layer 15 are intended to improve or provide the mountability of the ceramic electronic component 1. The second layer 14 is defined by a plating film containing, for example, nickel as its main constituent, and functions as a solder barrier layer, whereas the third layer 15 is defined by a plating film containing, for example, tin or gold as its main constituent, and functions to provide solderability.

It is to be noted that the number of layers constituting the external terminal electrodes 9 and 10 can be increased or decreased as necessary.

Next, a method for manufacturing the ceramic electronic component 1, in particular, a method for forming the external terminal electrodes 9 and 10 will be described.

First, as shown in FIG. 2-1, a component main body 2 is prepared which includes, at its surface, a ceramic surface of the ceramic provided by the ceramic layers 3 and 4 and a conductive surface of the conductor provided by the internal electrodes 5 and 6, and includes the ceramic surfaces with a high plating growth region 11 and a low plating growth region 12 formed.

In order to obtain this component main body 2, the following steps are carried out.

First ceramic green sheets are prepared which contain the first ceramic exhibiting relatively high plating growth, whereas second ceramic green sheets are prepared which contain the second ceramic exhibiting relatively low plating growth.

Next, a step is carried out for forming the internal electrodes 5 and 6 on specific ones of the first ceramic green sheets. For example, a method of printing a conductive paste is applied to the formation of the internal electrodes 5 and 6.

Next, the multiple first ceramic green sheets are stacked, including the first ceramic green sheets with the internal electrodes 5 and 6 formed. This stacking provides a laminate of the first ceramic green sheets.

Next, the second ceramic green sheets are attached to sections of the laminate of the first ceramic green sheets, for which the formation of the external terminal electrodes 9 and 10 is not desired. This attachment provides a green sheet laminate corresponding to the component main body 2 in the raw. It is to be noted that films containing the second ceramic may be formed, for example, by coating, instead of the attachment of the second ceramic green sheets.

Next, the green sheet laminate is subjected to firing. In this way, the component main body 2 is obtained.

Next, the external terminal electrodes 9 and 10 are formed respectively on the end surfaces 7 and 8 of the component main body 2 so as to be electrically connected to the internal electrodes 5 and 6.

For the formation of the external terminal electrodes 9 and 10, first, the first layer 13 is formed by plating on the end surfaces 7 and 8 of the component main body 2, as shown in FIG. 2-2. In the component main body 2 before the plating, as shown in FIG. 2-1, the plurality of internal electrodes 5 exposed at the one end surface 7 are electrically insulated from each other, and the plurality of internal electrodes 6 exposed at the other end surface 8 are electrically insulated from each other. In addition, the high plating growth regions 11 are located adjacent to the conductive surfaces provided by the respective exposed sections of the internal electrodes 5 and 6.

In order to form a plating film to serve as the first layer 13, metal ions in a plating solution are first deposited with the use of the conductive surfaces provided by the respective exposed sections of the internal electrodes 5 and 6 as starting points, and then, these plated deposits are grown on the high plating growth regions 11 to physically connect the plated deposits on the respective exposed sections of the adjacent internal electrodes 5 to each other and the plated deposits on the respective exposed sections of the adjacent internal electrodes 6 to each other. In this way, the first layers 13 are formed of a uniform and dense plating film.

As described previously, the external terminal electrodes 9 and 10 are arranged so as to extend from the WT surface, that is, the end surfaces 7 and 8 onto the both ends exposed in the length direction of the ceramic layers 3 constituting the intermediate layers. Therefore, the first layers 13 are also arranged so as to extend from the end surfaces 7 and 8 onto the both ends exposed in the length direction of the ceramic layers 3 constituting the intermediate layers. The high plating growth regions 11 extend from the end surfaces 7 and 8 onto the both ends exposed in the length direction of the ceramic layers 3 constituting the intermediate layers, thus allowing the first layers 13 to be arranged as described above. However, in the step of forming the first layers 13, the plating growth is controlled so as not to substantially cross over the boundaries between the high plating growth regions 11 and the low plating growth regions 12. In this case, while the plating growth for the formation of the first layers 13 could cross over the boundaries between the high plating growth regions 11 and the low plating growth regions 12 by a length substantially equal to plating growth in the thickness direction, the growth is absolutely limited so as not to cross over the boundaries between the high plating growth regions 11 and the low plating growth regions 12 toward the low plating growth regions 12.

At the stage prior to the plating step described above, the internal electrodes 5 and 6 are desirably exposed at the end surfaces 7 and 8 sufficiently. Therefore, the end surfaces 7 and 8 of the component main body 2 are preferably subjected to a polishing treatment. In this case, when the polishing treatment is carried out to the extent that the respective exposed ends of the internal electrodes 5 and 6 protrude from the end surfaces 7 and 8, the respective exposed ends expand in a planar direction, and the energy required for the plating growth can be further reduced.

Next, the component main body 2 with the first layers 13 formed as described above is preferably subjected to a heat treatment. As the heat treatment temperature, a temperature of, for example, 600° C. or more, preferably 800° C. or more is employed. This heat treatment forms an interdiffusion layer between the internal electrodes 5 and 6 and the first layer 13. Volume expansion of the metal caused in the interdiffusion layer can thus advantageously fill the gaps which can be present at the interfaces between the ceramic layers 3 and the internal electrodes 5 and 6 as well as the ceramic layers 3 and the first layers 13, thereby producing the effect of preventing the ingress of moisture into the component main body 2.

Next, the second layers 14 are formed by plating. In the case of the formation of the first layers 13 described above, the component main body 2 includes the ceramic section which provides the ceramic surfaces and the internal electrodes 5 and 6 formed in the ceramic section so as to be partially exposed at the surfaces of the ceramic section, and the conductive surfaces to serve as starting points for plating deposition are provided by the internal electrodes 5 and 6. However, in the case of forming the second layers 14, conductive surfaces to serve as starting points for plating deposition are provided by the first layers 13 as conductor films formed on the exposed surfaces of the internal electrodes 5 and 6. Therefore, in the formation of the second layers 14, the sections to be plated have continuous surfaces with conductivity, and the second layers 14 can be thus more easily formed than in the case of the first layers 13. In the case of the formation of the second layers 14, the plating growth is also limited so as not to cross over the boundaries between the high plating growth regions 11 and the low plating growth regions 12 toward the low plating growth regions 12.

Next, the third layers 15 are formed by plating. In the case of forming the third layers 15, conductive surfaces to serve as starting points for plating deposition are provided by the second layers 14 described above. Therefore, as in the case of the formation of the second layers 14, in the formation of the third layers 15, the sections to be plated have continuous surfaces with conductivity, and the third layers 15 can be thus more easily formed than in the case of the first layers 13. In the case of the formation of the third layers 15, the plating growth is also limited so as not to cross over the boundaries between the high plating growth regions 11 and the low plating growth regions 12 toward the low plating growth regions 12.

After each plating step for forming each of the first layers 13, second layers 14, and third layers 15 described above, a cleaning step with pure water is carried out.

In the way described above, the external terminal electrodes 9 and 10 are formed to complete the ceramic electronic component 1.

Next, a more preferable method for manufacturing the ceramic electronic component 1, in other words, a manufacturing method which is more suitable for mass production will be described with reference to FIGS. 3 through 6.

First, as described previously, first ceramic green sheets are prepared which contain the first ceramic exhibiting relatively high plating growth, whereas second ceramic green sheets are prepared which contain the second ceramic exhibiting relatively low plating growth.

Next, the internal electrodes 5 and 6 are formed on specific ones of the first ceramic green sheets.

Next, the multiple first ceramic green sheets are stacked, including the first ceramic green sheets with the internal electrodes 5 and 6 formed, to prepare a laminate of the first ceramic green sheets.

Figure 3:
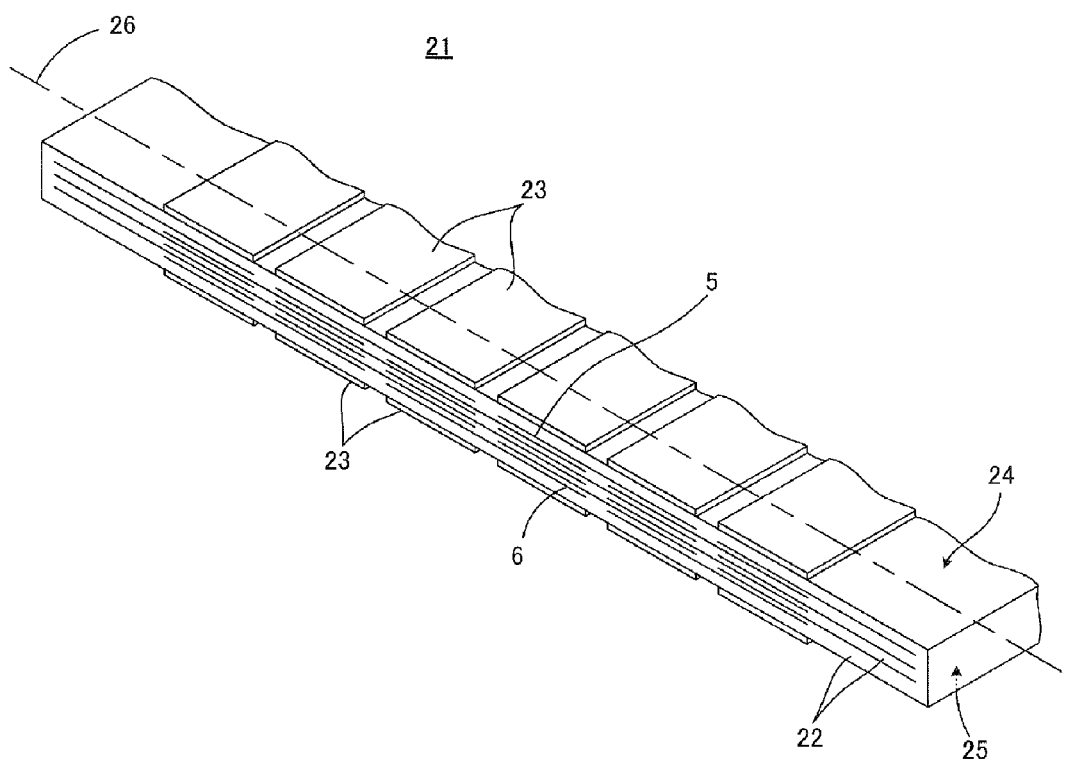
FIG. 3 is a perspective view for explaining a more preferable method for manufacturing the ceramic electronic component shown in FIG. 1, which partially illustrates an assembled green sheet laminate with a second ceramic green sheet attached to a location requiring no formation of a plating film.

For the preparation of a laminate of the first ceramic green sheets, an assembled green sheet laminate 21 is preferably prepared which has a plurality of sections to serve as component main bodies 2 distributed in rows and columns as partially shown in FIG. 3. In FIG. 3, the first ceramic green sheets 22 and the internal electrodes 5 and 6 are shown.

Next, the second ceramic green sheets 23 are attached to sections of principal surfaces 24 and 25 of the assembled green sheet laminate 21, for which the formation of the external terminal electrodes 9 and 10 is not desired. It is to be noted that films containing the second ceramic may be formed, for example, by coating, instead of the attachment of the second ceramic green sheets 23.

Figure 4:
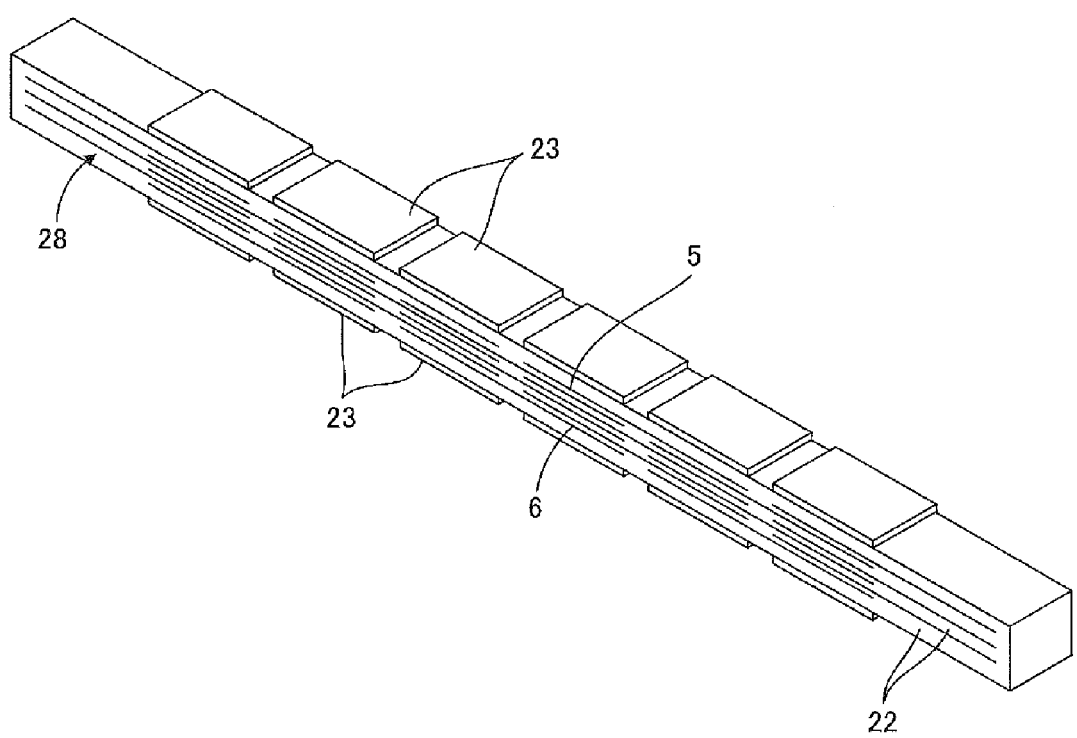
FIG. 4 is a perspective view illustrating a stripe-shaped green sheet laminate obtained by cutting the assembled green sheet laminate shown in FIG. 3 into strip shapes.

Next, the assembled green sheet laminate 21 is cut into strips along a cutting line 26 shown in FIG. 3. This cutting produces a plurality of strip-shaped green sheet laminates 27 as shown in FIG. 4.

Figure 5:
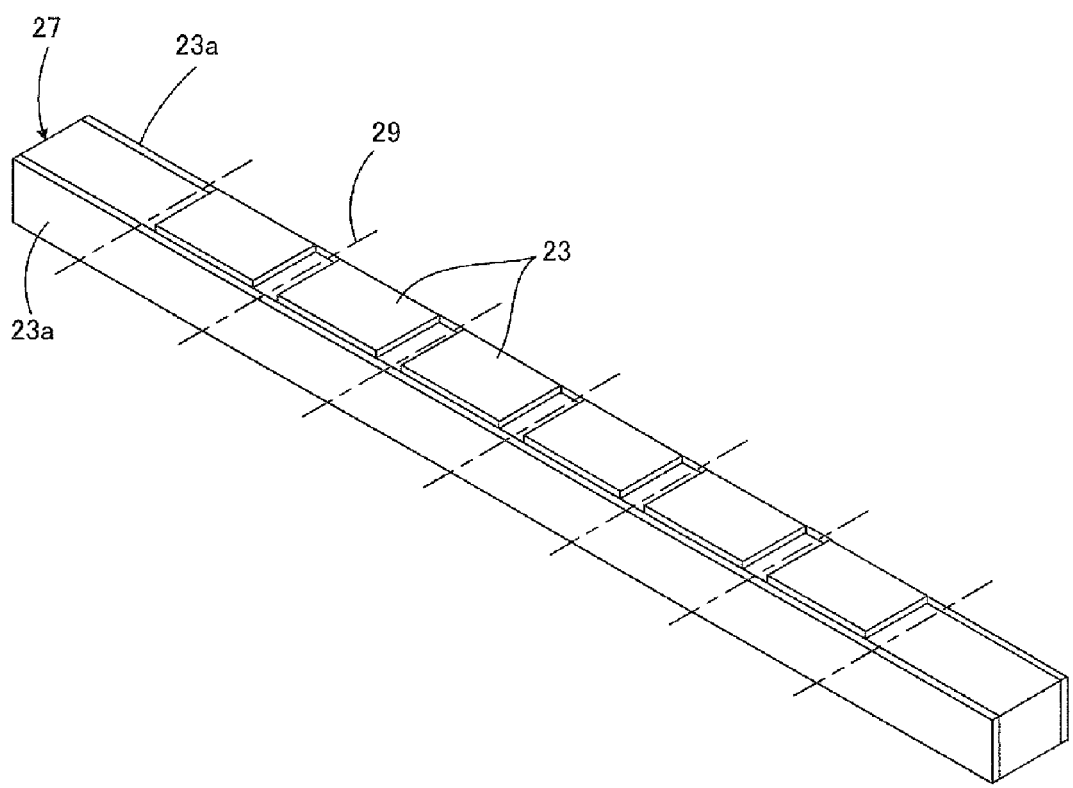
FIG. 5 is a perspective view illustrating the stripe-shaped green sheet laminate shown in FIG. 4 with a second ceramic green sheet attached onto a surface developed by the cutting.

Next, as shown in FIG. 5, a second ceramic green sheet 23a for a side surface is attached onto a surface 28 (see FIG. 4) of the strip-shaped green sheet laminate 27, which is developed by the cutting. It is to be noted that a film containing the second ceramic may be formed, for example, by coating, instead of the attachment of the second ceramic green sheet 23a for a side surface.

Next, the strip-shaped green sheet laminate 27 is cut along a cutting line 29 shown in FIG. 5. This cutting produces a plurality of green sheet laminates 30 for individual ceramic electronic components 1 as shown in FIG. 6.

Next, the green sheet laminates 30 are subjected to firing, thereby producing component main bodies 2.

After that, the step of forming the external terminal electrodes 9 and 10 is carried out as described previously to complete ceramic electronic components 1.

It is to be noted that, for example, the first ceramic green sheets 22 and the second ceramic green sheets 23 and 23a are shown with exaggeration in terms of thickness in FIGS. 3 through 6, which do not necessarily correspond to the elements included in the component main body 2 shown in FIGS. 1 and 2. However, it is to be understood that priority is given to convenience for ease of illustration in FIGS. 3 through 6.

While the present invention has been described in connection with the preferred embodiments shown in the figures, other various types of modification examples and additional preferred embodiments are possible within the scope of the present invention.

For example, the first layers 13 of the external terminal electrodes 9 and 10 may be thick films formed by firing of a conductive paste, rather than films formed by plating. In this case, in the formation of plating films to serve as the second layers 14 or the third layers 15, the combination of the high plating growth regions 11 and the low plating growth regions 12 will act effectively.

In addition, the component main body is not limited to having a stack structure. Therefore, preferred embodiments of the present invention can also be applied to ceramic electronic components including a component main body of, for example, a single-layer structure. As described above, as can be seen from the possibility that the first layers 13 can be thick films in some cases, and from the possibility that the ceramic electronic component may include a component main body of a single-layer structure, the starting points for plating deposition are not limited to the exposed ends of the internal electrodes, but may be conductor films formed on the component main body. Therefore, the plating films formed in various preferred embodiments of the present invention are not limited to at least partially constituting the external terminal electrodes, but may constitute conductor films which have other function than the function as a terminal.

An experimental example will be described below which was carried out for confirming the advantageous effects of various preferred embodiments of the present invention.

As samples, laminated ceramic capacitors were prepared. As their component main bodies, a component main body that was approximately 0.94 mm in length, 0.47 mm in width, and 0.47 mm in thickness was prepared through the production in accordance with the manufacturing method described with reference to FIGS. 3 through 6. In the component main body, ceramic layers constituting intermediate layers were made of a barium titanate based dielectric ceramic, ceramic layers for the outermost layers and side surfaces were made of a calcium zirconate based dielectric ceramic, and internal electrodes contained Ni as their main constituent. In addition, in the component main body, the number of stacked internal electrodes was 220, and the thickness was 1.5 μm for each of the ceramic layers constituting the intermediate layers, as well as the ceramic layers constituting the outermost layers and the ceramic layers for the side surfaces.

Next, the component main body was put in a barrel of 70 mm in diameter, and subjected to a polishing treatment at 300 rpm for 20 minutes, along with PSZ balls of 0.8 mm in diameter, alumina powders, and water.

Next, 500 samples of the component main bodies were put in a 300 ml horizontal rotation barrel, and in addition, 100 ml of a conductive medium of 0.7 mm in diameter was put therein. Then, the rotation barrel was immersed in a Cu strike plating bath adjusted to pH 8.7 at a bath temperature of 30° C., and a current was applied at a current density of 0.10 A/dm$^2$ while rotating the barrel at a barrel peripheral speed of 2.6 m/min to form a Cu strike plating layer with a film thickness of 1 μm directly on the high plating growth regions of the component main bodies. It is to be noted that the Cu strike plating bath contained 14 g/liter of copper pyrophosphate, 120 g/liter of potassium pyrophosphate, and 10 g/liter of potassium oxalate.

Subsequently, the rotation barrel with the component main bodies, etc. put therein was immersed in a thick Cu plating bath ("Pyro-Bright Process" from C. Uyemura & Co., Ltd.) adjusted to pH 8.6 at a bath temperature of 55° C., and a current was applied at a current density of 0.30 A/dm$^2$ while rotating the barrel at a barrel peripheral speed of 2.6 m/min to form a thick Cu plating layer with a film thickness of 5 μm on the Cu strike plating layer.

The Cu plating film of the Cu strike plating layer and thick Cu plating layer formed as described above is intended to provide the first layer of the external terminal electrode.

Next, the component main body with the Cu plating film as the first layer formed as described above was subjected to a heat treatment under the conditions: a top keeping temperature of 700° C.; keeping time of 30 minutes; and an oxygen concentration of 5 ppm.

Next, 30 ml of the component main bodies in total volume was put in a 300 ml horizontal rotation barrel, and in addition, and 70 ml of solder balls of 0.7 mm in diameter was put therein. Then, the rotation barrel was immersed in a Watt bath (a weak acid Ni bath) adjusted to pH 4.2 at a bath temperature of 60° C., and a current was applied at a current density of 0.20 A/dm$^2$ for 60 minutes while rotating the barrel at a rotation speed of 20 rpm to form, on the Cu plating film, a Ni plating film with a film thickness of about 4 μm to serve as the second layer of the external terminal electrode.

Subsequently, "NB-RZS" from Ishihara Chemical Co., Ltd. was used as a plating bath, and set at a temperature of 30° C. and pH 4.5 to apply a current at a current density of 0.10 A/dm$^2$ for 60 minutes, thereby forming, on the Ni plating film, a Sn plating film with a film thickness of about 4 μm to serve as the third layer of the external terminal electrode.

For 200 samples of the laminated ceramic capacitors obtained in the manner described above, the variation in dimension in the L direction obtained for the external terminal electrode on the LW surface of the component main body was 5% in terms of CV value.

On the other hand, for 200 samples of laminated ceramic capacitors produced through the same steps as described above, except that the attachment of the second ceramic green sheet 23 shown in FIG. 3 was not carried out, the variation in dimension obtained in the same way was 25% in terms of CV value.

It is determined from the results described above that the combination of the high plating growth region and the low plating growth region with the two types of ceramics which have different compositions from each other is effective for suppressing plating growth in locations requiring no plating growth while ensuring favorable plating growth in locations requiring plating growth.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a component main body with a surface including a ceramic surface of a ceramic and a conductive surface of a conductor; and
   a plating film including a plated deposit deposited with the conductive surface as a starting point and grown on the ceramic surface; wherein
   the ceramic surface includes a high plating growth region of a first ceramic, the high plating growth region exhibiting relatively high plating growth, and a low plating growth region of a second ceramic different from the first ceramic, the low plating growth region exhibiting relatively low plating growth; and
   the plating film is formed from the conductive surface in such a way that growth is limited so as not to cross over a boundary between the high plating growth region and the low plating growth region toward the low plating growth region.

2. The ceramic electronic component according to claim 1, wherein the component main body comprises:
   a ceramic section including the ceramic surface; and
   an internal electrode arranged in the ceramic section so as to be partially exposed at a surface of the ceramic section; wherein
   at least a portion of the conductive surface is provided by the internal electrode.

3. The ceramic electronic component according to claim 1, wherein the component main body comprises:
   a ceramic section including the ceramic surface;
   an internal electrode arranged in the ceramic section so as to be partially exposed at a surface of the ceramic section; and
   a conductor film located on the exposed surface of the internal electrode in the ceramic section; wherein
   at least a portion of the conductive surface is provided by the conductor film.

4. The ceramic electronic component according to claim 1, wherein the component main body has a stack structure including a plurality of stacked ceramic layers and a plurality of internal electrodes arranged along specific interfaces between the ceramic layers and partially exposed;
   the component main body has a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T;
   the internal electrodes extend parallel or substantially parallel to the LW surface, the WT surface corresponds to exposed surfaces of the internal electrodes;
   the plating film defines at least a portion of an external terminal electrode electrically connected to the internal electrodes, and is arranged so as to cover the WT surface and extend from the WT surface to at least a portion of the LW surface; and
   the component main body includes an outer surface including the second ceramic, except for a region of the outer surface with the plating film located thereon.

5. The ceramic electronic component according to claim 4, wherein among the ceramic layers included in the component main body, the ceramic layers constituting the outermost layers include the second ceramic, whereas the ceramic layers constituting intermediate layers include the first ceramic, and the ceramic layers constituting the outermost layers have a shorter length dimension as compared with the ceramic layers constituting the intermediate layers, and are stacked so as to expose both ends in the length direction of the ceramic layers constituting the intermediate layers;
   the component main body further includes a ceramic layer of the second ceramic arranged so as to follow the LT surface; and
   the plating film is arranged to extend from the WT surface to the exposed both ends in the length direction of the ceramic layers constituting the intermediate layers.

6. The ceramic electronic component according to claim 1, wherein the first ceramic has a composition containing barium titanate as its main constituent, whereas the second ceramic has a composition containing calcium zirconate as its main constituent.

7. A method for manufacturing a ceramic electronic component, the method comprising:
   a step of preparing a component main body with a surface including a ceramic surface of a ceramic and a conductive surface of a conductor, the ceramic surface including a high plating growth region of a first ceramic, the high plating growth region exhibiting relatively high plating growth, and a low plating growth region of a second ceramic different from the first ceramic, the low plating growth region exhibiting relatively low plating growth; and
   a plating treatment step of forming a plating film by depositing a plated deposit with the conductive surface as a starting point and growing the plated deposit from the conductive surface such that growth is limited so as not to cross over the boundary between the high plating growth region and the low plating growth region toward the low plating growth region.

8. The method for manufacturing a ceramic electronic component according to claim 7, wherein the step of preparing the component main body comprises the steps of:
preparing first ceramic green sheets containing the first ceramic;
forming an internal electrode on specific ones of the first ceramic green sheets;
obtaining a laminate including the first ceramic green sheets by stacking the first ceramic green sheets;
obtaining a green sheet laminate corresponding to the component main body in the raw by forming a film containing the second ceramic in a location of the laminate including the first ceramic green sheets, the location requiring no formation of the plating film; and
firing the green sheet laminate.

9. The method for manufacturing a ceramic electronic component according to claim 7, wherein the step of preparing the component main body comprises the steps of:
preparing first ceramic green sheets containing the first ceramic;
forming an internal electrode on specific ones of the first ceramic green sheets;
producing an assembled green sheet laminate by stacking the first ceramic green sheets, the assembled green sheet laminate having a plurality of sections to serve as component main bodies distributed in rows and columns;
forming a film containing the second ceramic in a location of a principal surface of the assembled green sheet laminate, the location requiring no formation of the plating film; then
extracting a plurality of strip-shaped green sheet laminates by cutting the assembled green sheet laminate into strip shaped portions;
forming a film containing the second ceramic on surfaces of the strip-shaped green sheet laminates that were formed by the cutting;
extracting a plurality of green sheet laminates for individual ceramic electronic components by cutting the strip-shaped green sheet laminates; and
firing the green sheet laminates.

10. The method for manufacturing a ceramic electronic component according to claim 8, wherein the step of forming the film containing the second ceramic comprises a step of preparing a second ceramic green sheet including the second ceramic, and a step of attaching the second ceramic green sheet.

* * * * *